United States Patent [19]
Sauber

[11] Patent Number: 5,599,005
[45] Date of Patent: Feb. 4, 1997

[54] INSULATOR MOUNTABLE CABLE STRINGING ROLLER DEVICE

[76] Inventor: Charles J. Sauber, 10 N. Sauber Rd., Virgil, Ill. 60182

[21] Appl. No.: 434,177

[22] Filed: May 3, 1995

Related U.S. Application Data

[63] Continuation-in-part of Ser. No. 402,122, Mar. 10, 1995, Pat. No. 5,533,710.

[51] Int. Cl.[6] ................................................. B65H 59/00
[52] U.S. Cl. ................................................ 254/134.3 PA
[58] Field of Search ........................... 254/389, 401–403, 254/407, 411, 413, 409, 134.3 PA, 134.3 R, 134.3 FT; 269/97, 98, 130–133, 126–129

[56] References Cited

U.S. PATENT DOCUMENTS

| 1,794,998 | 3/1931 | Weinberger | 254/134.3 PA |
| 2,571,246 | 10/1951 | Hubbard | 254/134.3 PA |
| 2,955,818 | 10/1960 | Pahl et al. | 269/97 |
| 3,637,011 | 1/1972 | Wheeler | 269/97 |
| 5,064,172 | 11/1991 | Hereford | 254/134.3 PA |

Primary Examiner—Robert C. Watson
Attorney, Agent, or Firm—Leydig, Voit & Mayer, Ltd.

[57] ABSTRACT

A cable installation roller or sheave assembly for temporarily supporting cable on an insulator carried by a cross member of a pole during installation of the cable onto an insulator. The roller assembly has supporting brackets which include upstanding inwardly bent fingers spaced from one another for containing the cable. A roller which is bearing mounted for easy rotation is held between the brackets. A clamping base mountable to the cross member of a pole surrounds the insulator and in turn carries the bracket by way of a support arm. The support arm is angularly adjustably attached to the clamp base and support brackets. The clamping base has a pivotable leg and an adjustable lever actuated clamp latch device which releasably holds the base legs to the insulator. Resilient pads on the leg insides protect the insulator. When the assembly clamp is released the cable can be lowered downwardly onto the insulator and then the assembly when rotated 90° releases itself from the cable.

7 Claims, 8 Drawing Sheets

INSULATOR MOUNTABLE CABLE STRINGING ROLLER DEVICE

RELATED APPLICATION

This is a continuation-in-part of my copending application Ser. No. 08/402,122, filed Mar. 10, 1995, now U.S. Pat. No. 5,533,710 entitled Cable Stringing Roller Device.

FIELD OF THE INVENTION

The present invention relates generally to roller sheaves for supporting cable during cable installation and more particularly to a cable stringing roller device for installation of cable.

BACKGROUND OF THE INVENTION

Figure 1:
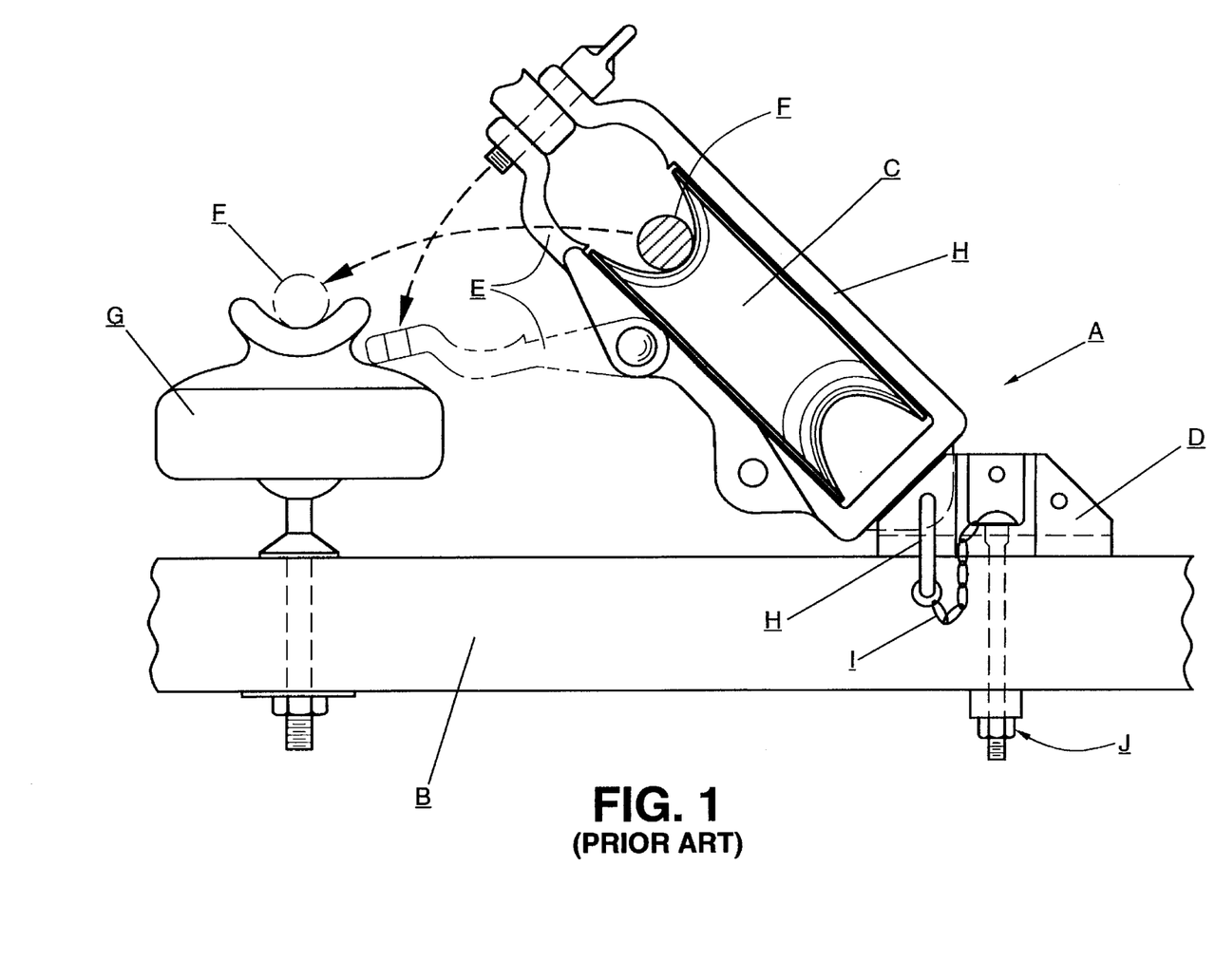
FIG. 1 is a frontal elevational view of a prior art cable stringing roller or sheave mounted on a cross bar showing the open position (in phantom) and closed position of the cap and an angular position of the cable sheave at cable installation.

Various types of roller sheaves for stringing cable and transferring it to an insulator have been previously used in the art. One type as shown in FIG. 1, generally includes a support bracket A which is fixedly attached to a cross-bar B of a electrical pole. A sheave assembly C is connected via a clamping base D to the cross-bar and the sheave assembly may be positioned on the base at angular or perpendicular positions. Also the sheave assembly bracket has a cap E for containing the cable F which may be opened to transfer the cable to its final location on an insulator G.

These prior art cable stringing roller sheaves present many problems and difficulties during use. It is difficult, for example, to manipulate and move the sheave assembly between the vertical and either angular position.

In order to manipulate the cable from its first position resting on the sheave to a second position on the insulator, the cable must be physically lifted from the sheave angular position onto the insulator. The rotatable cap opens downwardly and it is difficult to manipulate for shifting of the cable.

In addition, the fastener used to close the rotating cap is hard to remove and may require tools to open and close.

The sheave assembly housing is connected to the base, as shown in FIG. 1, by means of a pin H which is tethered to the base by a chain I. The chain may easily be broken or separated permitting the pin to become lost. Furthermore, the position of the sheave assembly housing relative to the base is fixed during an installation and can only be changed between installations.

The roller sheave clamping base is difficult and time consuming to mount onto the cross member. Multiple fasteners J requiring tools are required to secure the base and may be easily lost or misplaced.

The present invention is directed toward overcoming one or more of the problems discussed above.

It is the primary object of the invention to provide an insulator mountable cable stringing roller or sheave which will allow simple and easy installation and an easier manipulation of the cable onto the insulator.

It is a related object of the invention to provide a cable stringing roller or sheave which eliminates the need for separable pins which may become lost or which may be needed as tether to the housing.

It is a further object of the invention to provide an insulator mountable cable stringing roller or sheave clamping base that is quicker and easier to install on an insulator.

Yet another object of the invention is to provide an insulator cable stringing roller or sheave which may be more easily removed and securely clamped without tethers or fasteners which may be lost.

A further object of the invention is to provide an insulator cable stringing roller or sheave that is relatively inexpensive to manufacture and assemble as well as easy to service.

Other objects and advantages of the invention will be apparent from the following detail description.

SUMMARY OF THE INVENTION

In accomplishing these and other objects of the invention, there is provided a cable installation roller or sheave assembly for temporarily supporting cable on an insulator carried by a cross member of a pole during installation of the cable onto an insulator. The roller assembly has supporting brackets which include upstanding inwardly bent fingers spaced from one another for containing the cable. A roller which is bearing mounted for easy rotation is held between the brackets. A clamping base mountable to the insulator in turn carries the bracket by way of a support arm which is attached to the clamp base and support brackets. The clamping base has an adjustable quick opening and closing coupling device to clamp it on different sized insulators. The clamping base has resilient inside pads that grip without breaking ceramic insulators. When the assembly clamp is released the cable can be lowered downwardly onto the insulator and then the assembly when rotated 90° releases itself from the cable.

DESCRIPTION OF THE PREFERRED EMBODIMENT

While the invention will be described in connection with a particular preferred embodiment, it will be understood that it is not intended to limit the invention to that particular embodiment. On the contrary, it is my intention to cover all alternatives, modifications, and equivalents as may be included within the spirit and scope of the invention as defined by the appended claims.

Figure 2:
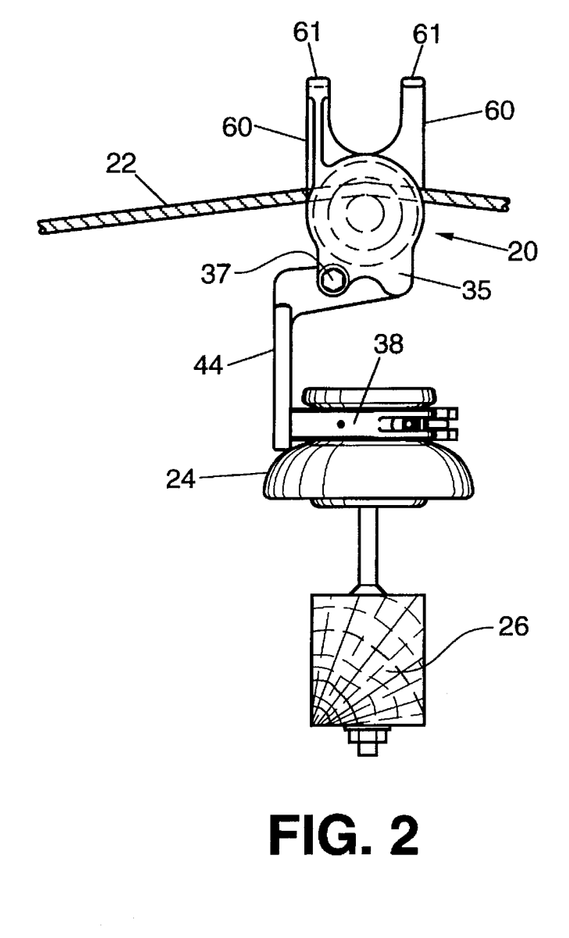
FIG. 2 is a side elevational view of a cable stringing roller or sheave assembly embodying the present invention as installed on an insulator carried by a cross member of a pole.

Now turning to the drawings, and referring first to FIG. 2, there is shown a cable stringing roller or sheave assembly 20 manufactured in accordance with the invention to support a cable 22 which is to be installed onto insulator 24 located on a cross member 26 of a utility pole (not shown). The roller or sheave assembly 20 is particularly suited for installation of cable 22 onto power distribution poles.

Figure 12:
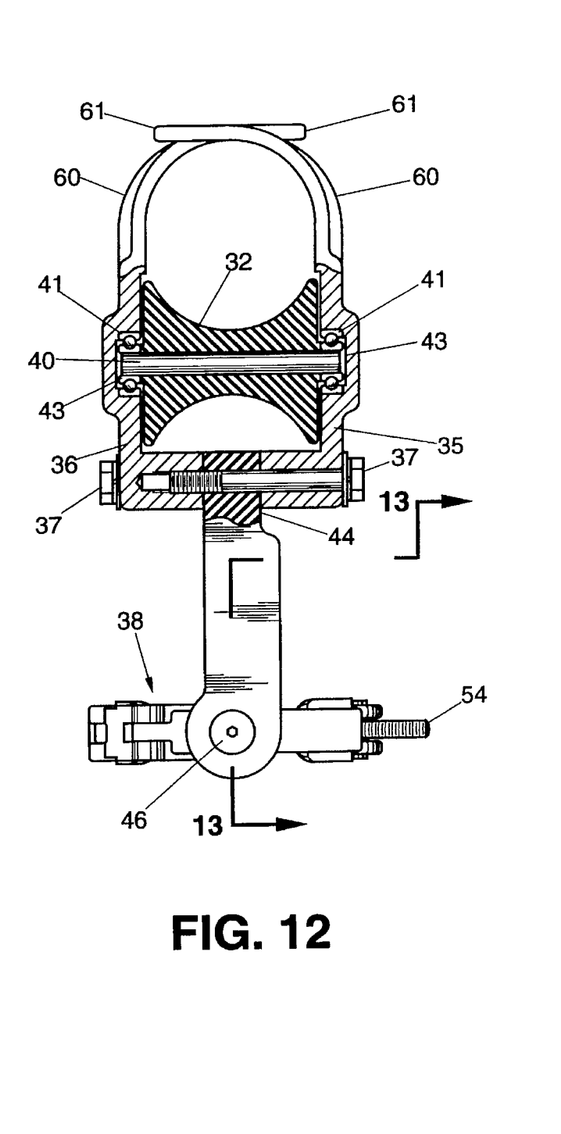
FIG. 12 is a partial sectional view taken along line 12—12 of FIG. 3.

The cable stringing roller or sheave assembly 20 has a freely rotatable roller 32 (FIGS. 4–12 and 14) upon which the cable 22 is guided. The sheave means may take any suitable form, but preferably it is a circumferentially U-shaped cylinder or hyperboloid preferably made of a rubber or rubber-like insulating material (FIG. 12) on which the cable 22 matingly rides. A pair of bracket means 35, 36 (FIG. 12) provides support for the roller 32, preferably about a shaft 40 with bearings 41 at opposite ends held in cup shaped recesses 43 in the brackets. The brackets 35, 36 are connected to an arm 44 held together by fasteners 37 and supported by a clamping base means 38 (FIG. 2) which connects the roller assembly 20 to the insulator 24. It will be noted that the brackets 35,36 are identical halves so that there is no need to manufacture and inventory right and left parts.

Figure 13:
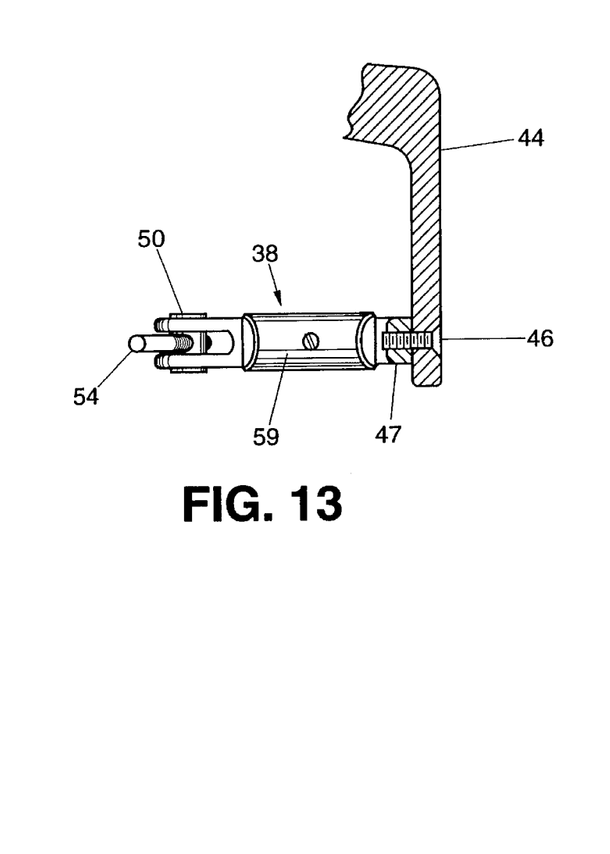
FIG. 13 is a sectional view taken along line 13—13 of FIG. 12.
Figure 14:
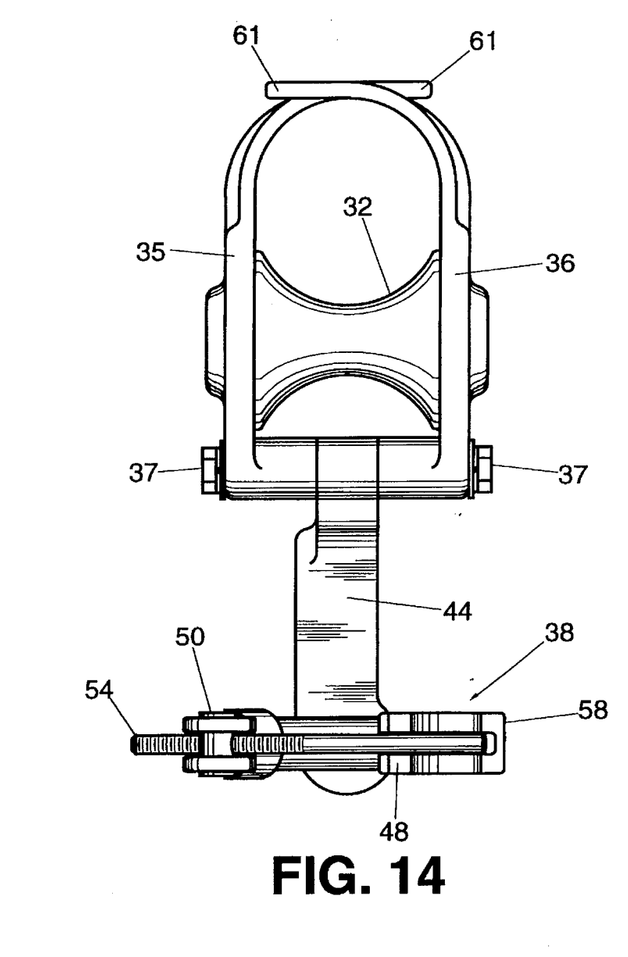
FIG. 14 is a front elevational view of the roller device.
Figure 15:
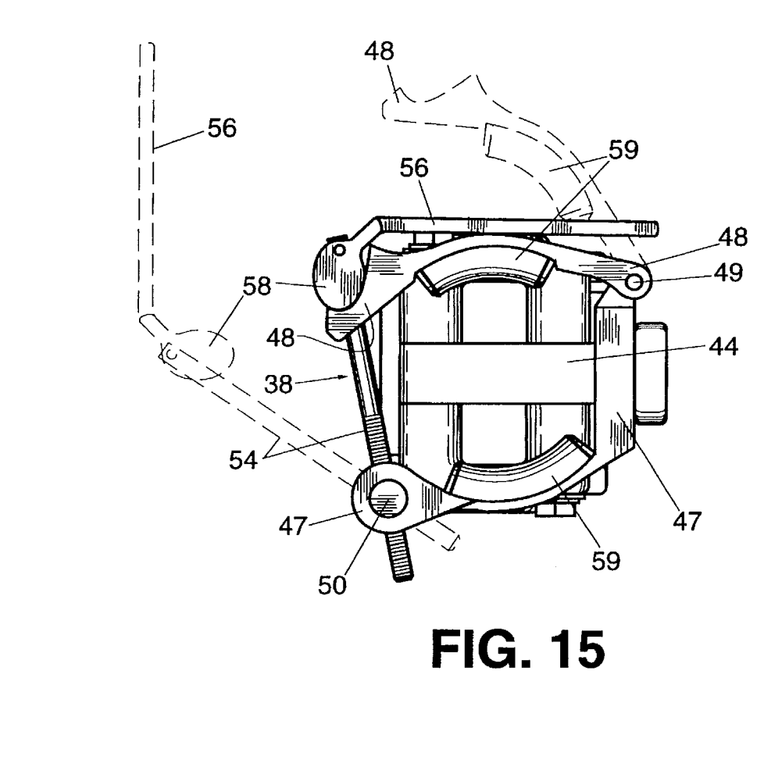
FIG. 15 is a bottom plan view thereof.

The arm 44 in the present form of the invention is mounted vertically with the respect to the clamping base means 38 by way of a screw 46 (FIG. 13) attached to leg number 47. Releasing of the screw 46 allows the roller device and arm 44 to be pivoted with respect to the clamping base 38 so that the roller device can be used for installing lines around curves or turns. The angular positioning is shown in FIGS. 6–7, and 9–10. The clamping base means 38 may have any suitable shape and configuration, but preferably it is U-shaped with fixed leg member 47 and hinged leg member 48 connected to the fixed leg member by a pin 49 (FIG. 15). The fixed leg member 47 outer end carries a cross pin 50 with a threaded opening that receives a rotatable screw means 54. The outer end of the screw means 54 is attached to a pivotal lever 56 having a cam member 58 that acts with the trough shaped end of the other leg 48 of the clamp means. Rotation of the screw means 54 and lever 56 in one direction or the other will either lengthen or shorten the intermediate portion of the screw means thereby allowing the clamping means to be adjusted for different diameter insulators.

Figure 4:
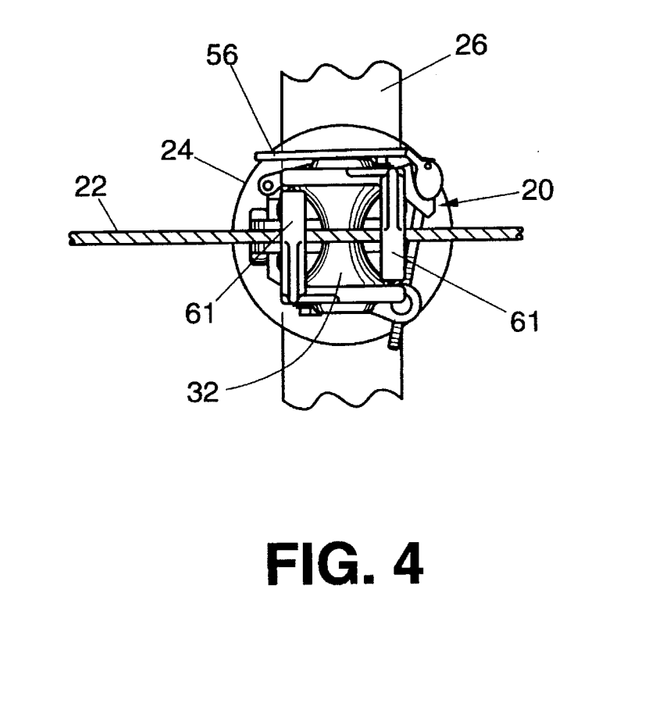
FIG. 4 is a top plan view of the cable stringing roller device of FIG. 2.

Referring to FIGS. 2 and 4, the roller assembly device 20 preferably for straight runs of cable can be mounted to the insulator 24. The base member legs 47, 48 in the present instance are positioned on opposite sides of the waist area of insulator 24 with the cable 22 being strung passing over the roller 32 and positioned directly over the top of the insulator 24. The lever 56 carried by the outer end of the rotatable screw 54 is provided with camming member 58 that engages with the trough shaped end of leg 48 so that the clamp legs can be drawn together and the lever 56 functions as an overcenter latch clamp device.

As best shown in FIG. 15, legs 47,48 each have a resilient pad 59 secured on the inside so that ceramic insulators are not damaged or broken by the clamping means 38.

Figure 3:
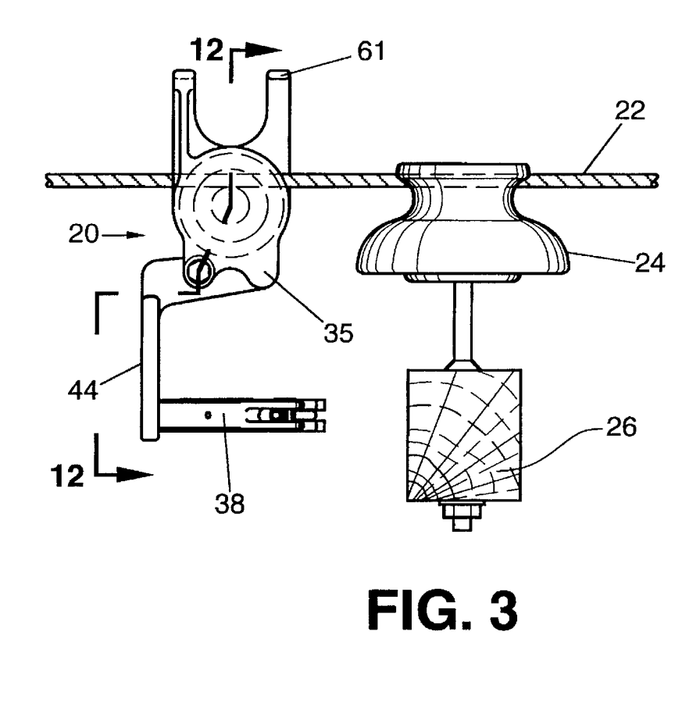
FIG. 3 is a side elevational view of a cable stringing roller device of the present invention showing the roller device in a removal position for lowering the cable on an insulator for cable stringing.
Figure 5:
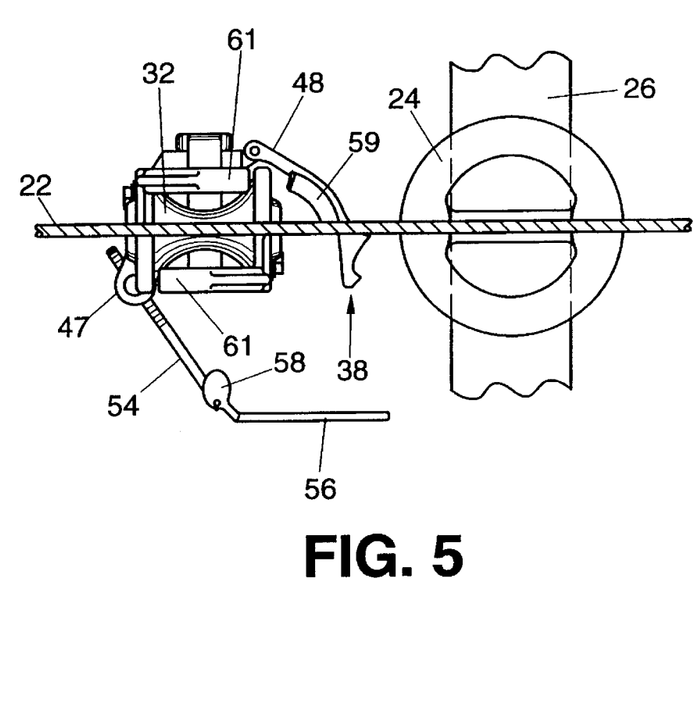
FIG. 5 is a top plan view showing the cable stringing roller device positioned for removal.
Figure 6:
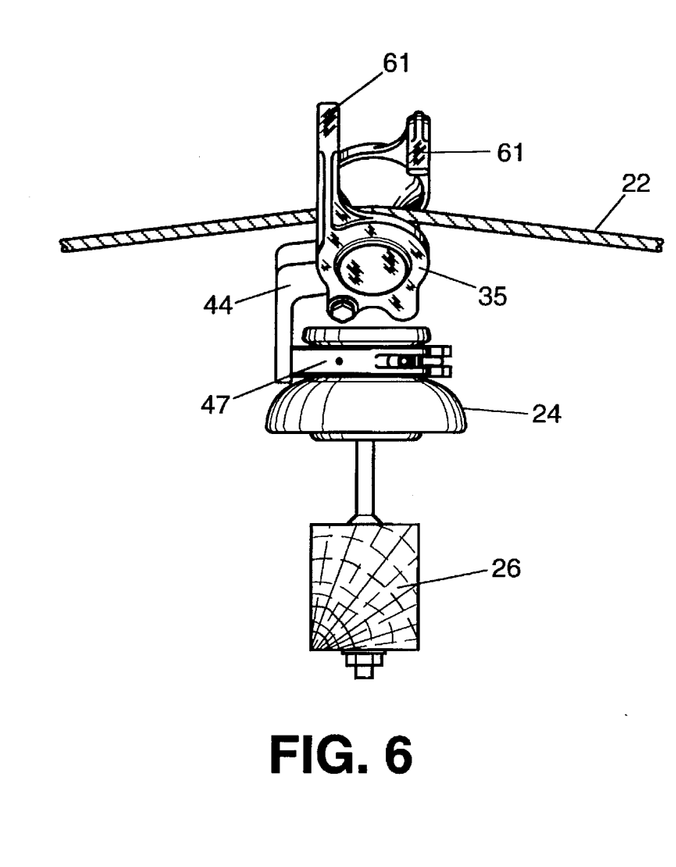
FIG. 6 is a side elevational view of the roller device in an angular position with respect to the clamping base.
Figure 7:
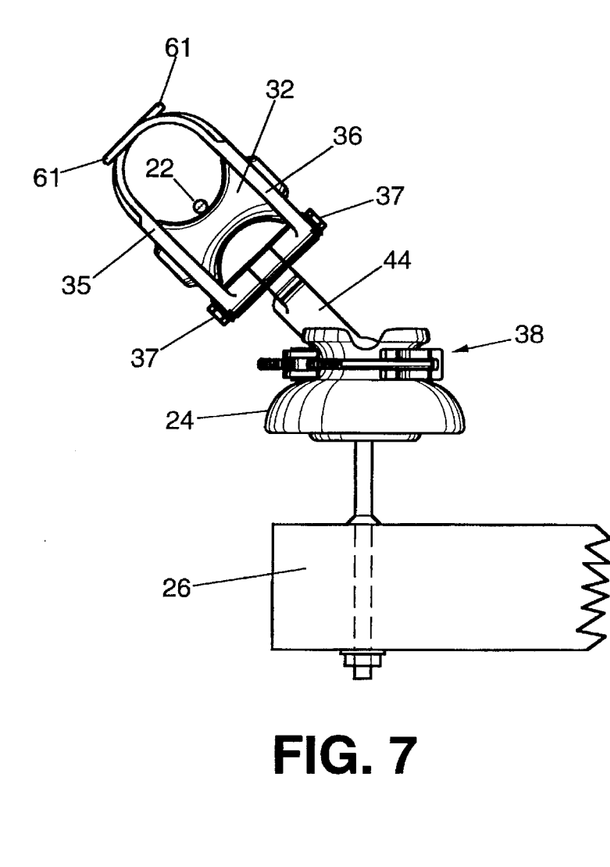
FIG. 7 is a front elevational view of the roller device as shown in the angled position of FIG. 6.
Figure 8:
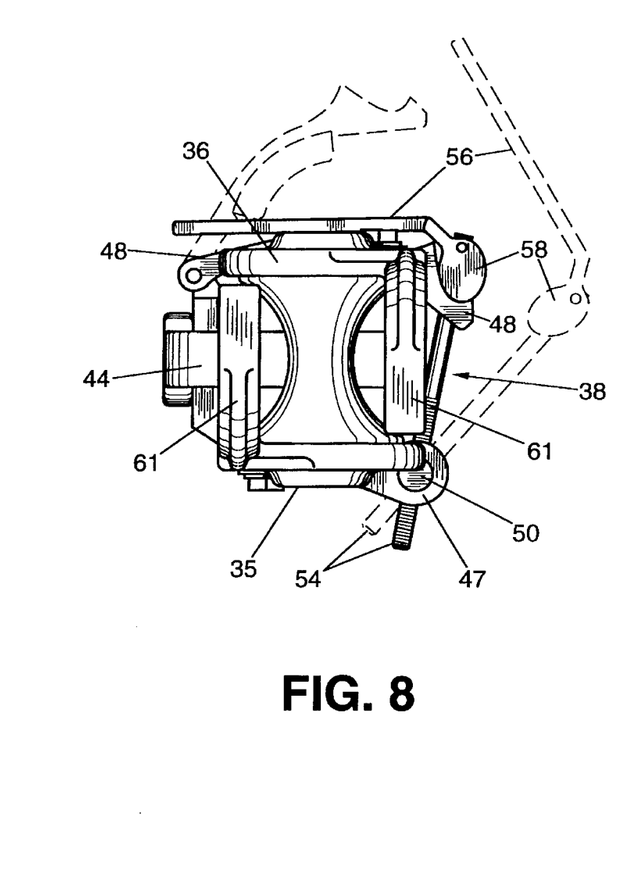
FIG. 8 is a top plan view of the roller device in the clamped position.
Figure 9:
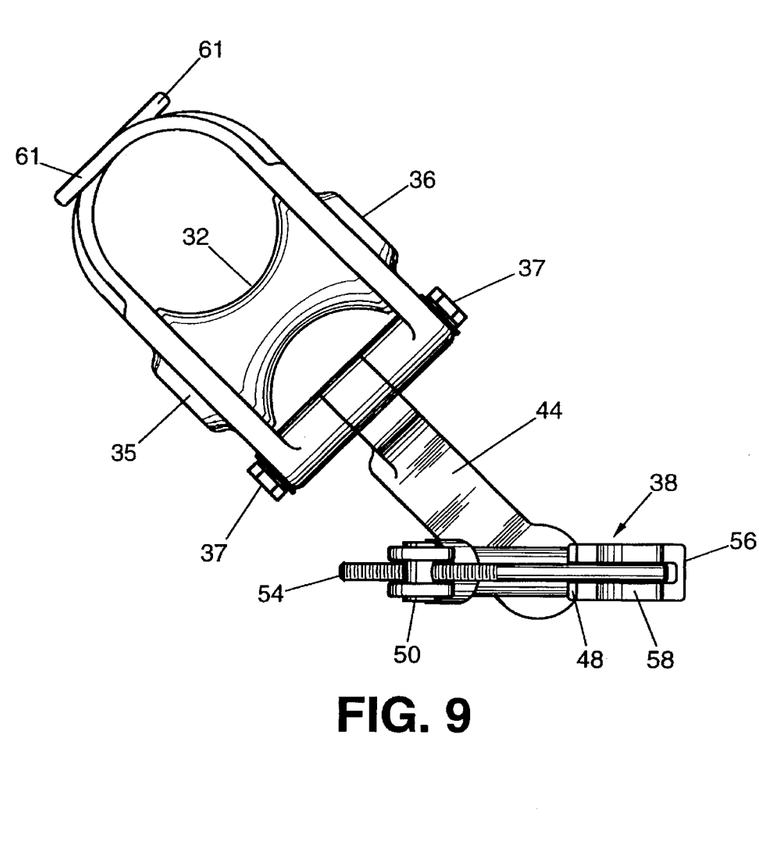
FIG. 9 is a frontal view of the device in an angled position.
Figure 10:
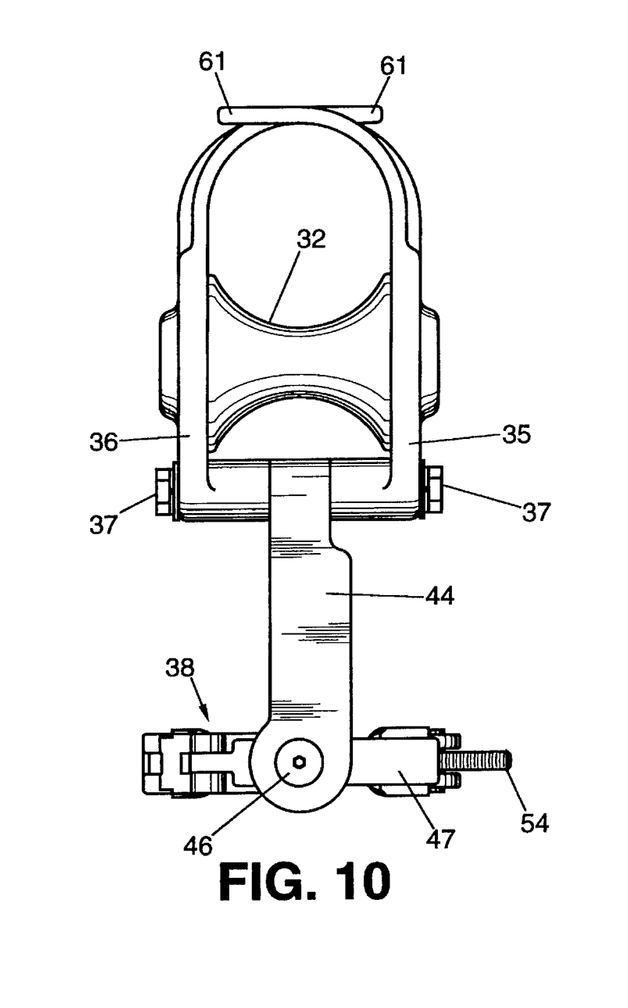
FIG. 10 is a rear elevational view of the roller device in an upright position.
Figure 11:
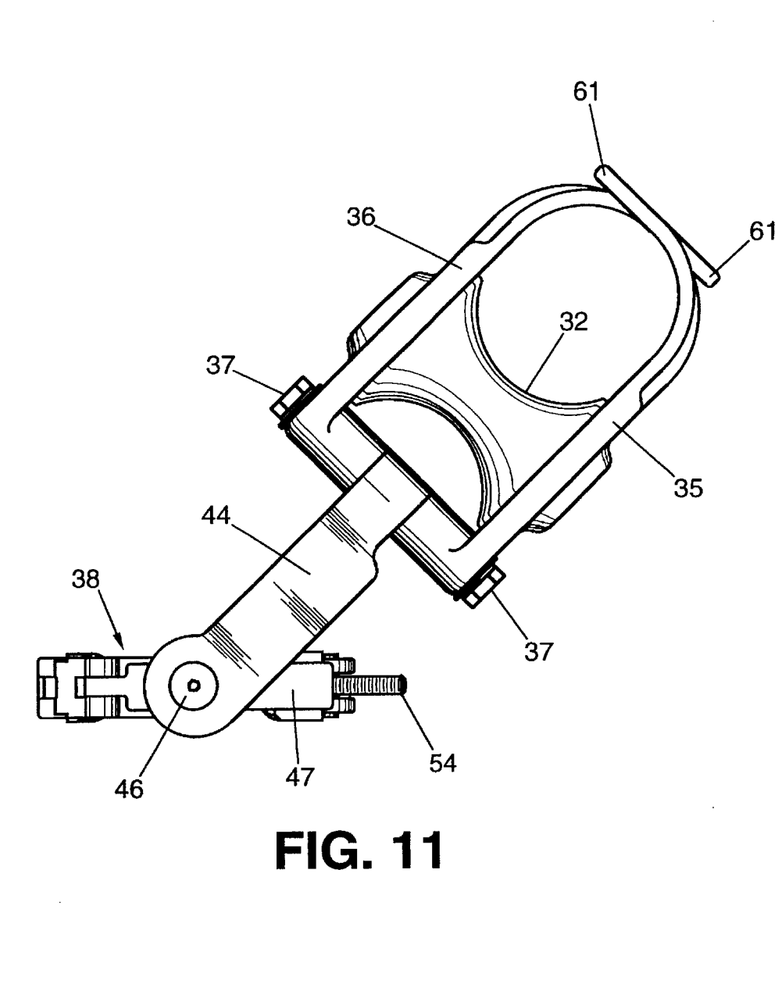
FIG. 11 is a rear elevational view of the roller device in an angled position.

After the cable has been properly tensioned, the clamping lever 56 can be released as shown in FIGS. 3 and 5, then the removal of the support arm and roller carrying brackets will allow the cable 22 to simply lower down onto the top of the insulator 24.

In accordance with one of the aspects of the present invention, the roller assembly device 22 when released from the insulator will still in that downward position hang on the cable and then can be easily removed by rotating the device by about 90° to a position where it releases itself from the cable. In carrying out this aspect of the invention, the supporting brackets have upwardly projecting portions 60 that respectively terminate an inwardly projecting fingers 61 spaced from one another and oppositely oriented on respective brackets 35, 36. The bracket fingers 61 when disposed transverse to the direction of the cable provide a top guide or will preclude the cable from rising up out of the interior portion of the roller device. When the roller device is turned 90° with the bracket fingers 61 disposed parallel to the cable, the roller device can be released from the cable.

I claim:

1. A cable stringing roller device for temporarily supporting cable on an insulator carried by a cross member of a pole during installation of the cable onto an insulator, said device comprising:

roller means for supporting the cable;

bracket means for supporting said roller means and for containing the cable, said bracket means having upwardly projecting portions disposed on opposite ends of said roller and terminating in inwardly projecting fingers spaced from one another;

support means connecting said bracket means to a clamping means adapted to clamp to said insulator and said clamping means having lever acting releasable latch means to allow the bracket and roller means to be shifted away from the insulator to lower the cable onto the insulator.

2. The cable stringing roller device of claim 1 wherein the clamping means includes a pivotable leg and said lever acting releasable latch means includes a rotatable screw means for varying the clamp size to accommodate the insulator.

3. The cable stringing roller device of claim 2 wherein the clamping means legs include resilient pads engageable with the insulator.

4. The cable stringing roller device of claim 2 wherein one end of the screw means engages a cross pin member with a threaded opening to adjust the clamping means for accommodating different sized insulators.

5. The cable stringing roller device of claim 1 wherein the roller is constructed from resilient non-conductive material.

6. The cable stringing roller device of claim 5 wherein the roller is freely rotatable with bearing journal support at opposite ends held by said bracket means.

7. A cable stringing roller device as claimed in claim 1 wherein said support means is adjustably connected to said clamping means for angular positioning with respect to the clamping means.

* * * * *